United States Patent [19]
Cooper

[11] Patent Number: 5,226,446
[45] Date of Patent: Jul. 13, 1993

[54] FLOW NOISE REDUCTION
[75] Inventor: Robert J. Cooper, West Dundee, Ill.
[73] Assignee: Eaton Corporation, Cleveland, Ohio
[21] Appl. No.: 720,353
[22] Filed: Jun. 25, 1991
[51] Int. Cl.$^5$ .............................................. F16K 17/24
[52] U.S. Cl. ..................................... 137/517; 137/859
[58] Field of Search ............... 137/498, 504, 517, 859; 138/42, 44, 45, 46, 43; 251/123

[56]  References Cited
U.S. PATENT DOCUMENTS

| | | | |
|---|---|---|---|
| 1,997,404 | 4/1935 | Hamilton | 137/504 X |
| 2,936,788 | 5/1960 | Dahl et al. | 138/45 |
| 2,960,109 | 11/1960 | Wilson | 137/517 |
| 4,221,335 | 9/1980 | Shames et al. | 138/45 X |

Primary Examiner—Stephen M. Hepperle
Attorney, Agent, or Firm—R. A. Johnston

[57] ABSTRACT

A flow noise reduction assembly having a fixed flow limiting orifice or an inlet pressure responsive flow control washer having a flow limiting orifice. A conically faced diverter is disposed closely adjacent the downstream face of the orifice and an expansion chamber is disposed downstream of the flow diverter for noise attenuation.

7 Claims, 2 Drawing Sheets

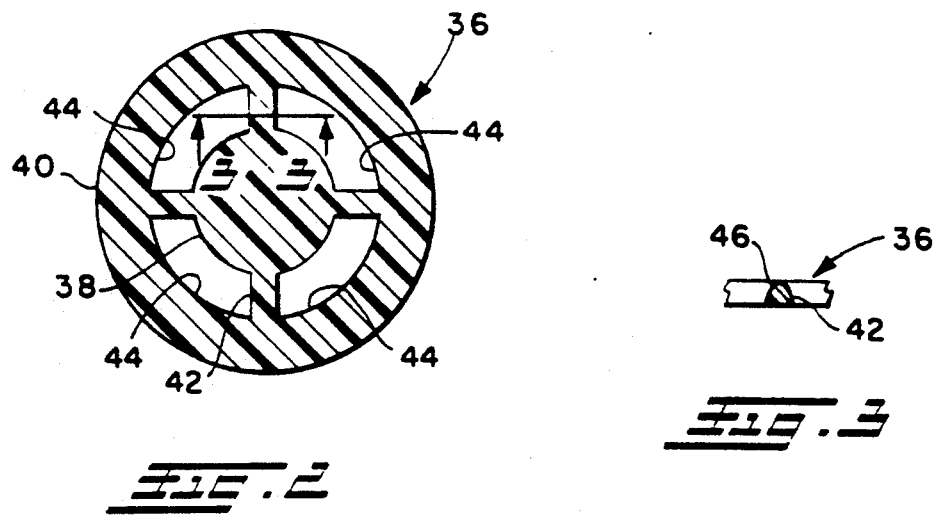
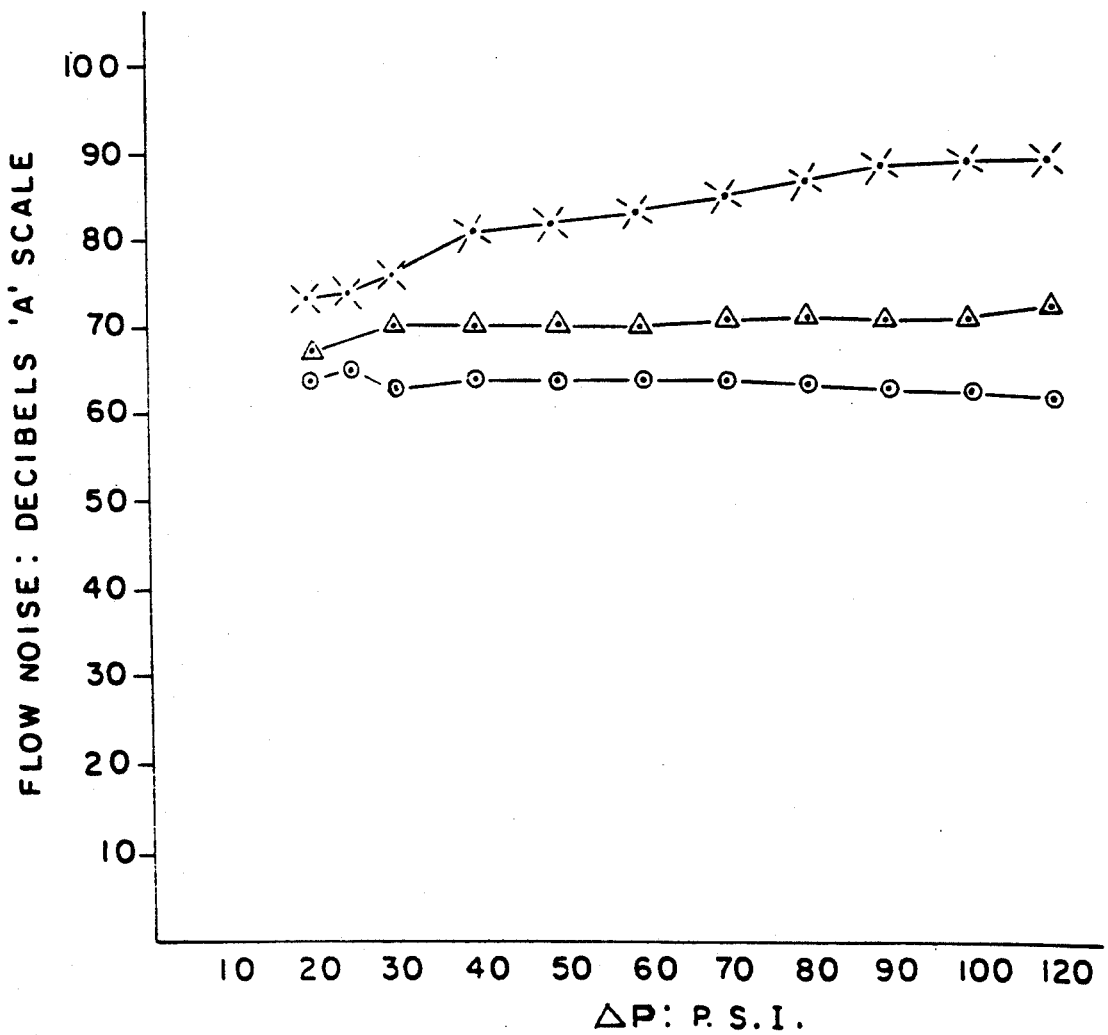

FLOW NOISE REDUCTION

BACKGROUND OF THE INVENTION

The present invention relates to devices for controlling the flow rate in a conduit and particularly to flow control of water to the inlet of a household appliance such as a dishwasher, clothes washer, or refrigerator ice maker. In providing flow rate control to household appliances connected to municipal water supplies, it is desired to provide a generally constant flow rate to the appliance inlet in the face of wide variations in the water supply pressure. Various types of flow control devices have been employed for this purpose; and, a particularly well known device is an elastomeric washer which deforms resiliently under increasing supply pressure to restrict the flow orifice size, thereby maintaining a constant flow rate.

However, in providing flow control to the water inlet of an appliance, problems have been experienced in excessive noise, where the restrictions of the flow control device have produced cavitation. In cases where the flow control is applied at the inlet of an electrically operated water inlet valve, the noise problem has been particularly exacerbated by the flow cavitation causing resonant vibration of the surrounding valve body structure. This problem has been particularly troublesome in appliance water inlet valves having body structure rigidly secured to a surrounding metal frame or cabinet of the appliance.

Where an appliance water inlet flow control device is required to control substantial restriction to accommodate relatively high water supply pressures for maintaining a constant flow rate to the appliance inlet, severe high frequency vibration has been encountered as cavitation occurred at the flow control device; and, the resulting noise is perceived to be quite objectionable to the appliance user. It has thus been desired to find an inexpensive way or means of controlling the noise associated with flow control devices employed for controlling the rate of flow at the inlet of an appliance.

SUMMARY OF THE INVENTION

The present invention provides a flow control assembly which may be employed in a conduit or at the inlet of a valve for controlling flow to an appliance or at the inlet or outlet of an appliance connected directly to a source of pressurized fluid. The flow control assembly of the present invention employs, in its simplest form, a flow control orifice plate disposed in the body of the assembly, with a transversely enlarged expansion chamber formed on the downstream or discharge side of the orifice plate, and with the outlet port of the expansion chamber substantially smaller than the width of the chamber. In the simplest form of the invention, a flow diverter having a tapered face, in the form of a cone having a preferably obtuse included apex angle is disposed spaced closely adjacent the discharge face of the orifice plate, with the apex of the cone extending into the orifice formed in the plate. However, in a more complex embodiment the orifice plate has the downstream side thereof tapered to form a diffuser with the diffuser having the included angle thereof generally common to the included angle of the diverter cone. Preferably, the diverter has a secondary conically tapered surface disposed concentrically with the tapered surface of obtuse angle, with the secondary cone having a generally right angle included apex angle. The diverter creates a pressure drop which minimizes cavitation and the expansion chamber attenuates noise. Optionally, a resilient elastomeric flow control washer may be disposed in a conduit on the upstream face of the orifice plate. In this arrangement, the central orifice of the flow control washer is chosen to be less than the diameter of the orifice in the orifice plate.

The present invention thus provides a unique and novel flow control assembly, which may be employed at the inlet of an appliance for diverting flow through the flow control orifice in a manner causing a pressure drop at the diverter to limit cavitation and an expansion chamber to attenuate flow noise. The present invention is readily employed as an in-line device or attached to the inlet or outlet of a water inlet valve.

BRIEF DESCRIPTION OF THE DRAWINGS

FIG. 2 is a cross section taken along section indicating lines 2—2 of FIG. 1;

FIG. 3 is a section view taken along section indicating lines 3—3 of FIG. 2.

DETAILED DESCRIPTION

Figure 1:
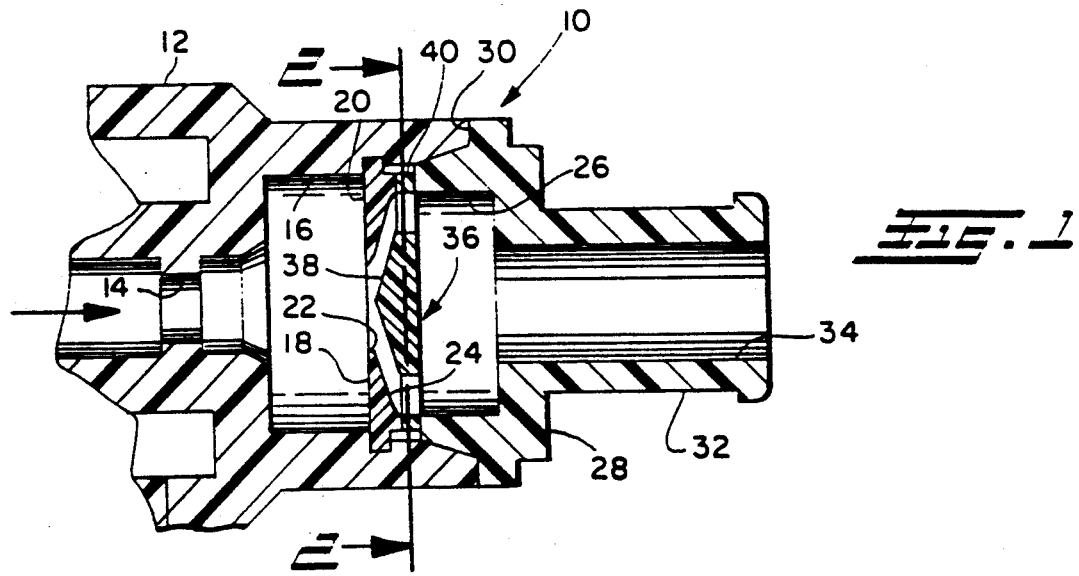
FIG. 1 is a cross section of a flow control assembly taken along the direction of flow therethrough, illustrating the simplest form of the invention.

Referring to FIG. 1, the flow control assembly is indicated generally at 10 and has a body or housing 12 with an inlet passage 14 formed therein, through which flow enters in the direction indicated by the black arrow in FIG. 1. The inlet passage 14 communicates with an enlarged cavity 16 which has an orifice plate 18 disposed therein, and secured peripherally therearound in any suitable manner as, for example, by snap-locking into groove 20, provided in the wall of the cavity 16. Orifice plate 18 has a flow limiting orifice 22 formed centrally therethrough, and preferably has the downstream or discharge face thereof conically tapered to form a diffuser cone 24.

The downstream side of orifice plate 18 communicates with an enlarged expansion chamber 26, which preferably has the largest dimension thereof transverse to the flow direction, or the diameter thereof, at least five multiples of the diameter of the orifice. The chamber has a substantially increased volume; and, in the present practice has its length not less than one-third the transverse dimension thereof established as described aforesaid. The increased volume of the chamber 26 aids in dissipating cavitation and attenuation of flow noise and is an essential feature of the invention with respect to noise reduction.

The chamber 26 is closed by a cover or outlet member 28 received over the body 12 and secured thereon in any suitable manner as, for example, non-metallic weldment about parting line 30.

The cover 28 has a boss or nipple 32 provided thereon, which has outlet passage 34 formed therethrough and communicating with the expansion chamber 26. In the presently preferred practice of the invention, the outlet 32 has the transverse dimension thereof in the direction of the flow, not greater than ½ the diameter of the transverse dimension of the expansion chamber.

Referring to FIGS. 1, 2, and 3, a flow diverter, indicated generally at 36, is shown as disposed in the expansion chamber immediately adjacent the downstream face of orifice diffuser cone 24. Diverter 36 has the face 38 thereof adjacent the diffuser cone 24 orifice formed in a conical configuration, and has a generally obtuse apex angle corresponding to the included apex angle of the diffuser cone 24. The base diameter of the conical diverter face 38 is, in the present practice of the invention at least 1½ multiples of the diameter of the flow control or limiting orifice 22, 122, 252. The outer periphery of diverter 36 is registered against the downstream face of the orifice plate 18, and is secured into the body by the cover 32.

Referring particularly to FIGS. 2 and 3, the diverter 36 has a plurality of circumferentially equally spaced radial spokes 42 extending between the cone 38 and the outer rim 40 of the diverter, which ribs form the plurality of arcuate passages 44 about the circumference of the cone 38. The ribs each have a streamlined or tapered configuration 46 provided on the upstream edge thereof as shown in FIG. 3.

The diverter face cone 38 is spaced a distance from the downstream face of the orifice plate or diffuser cone 24 by an amount or distance expressed as a ratio of the orifice diameter in the range of 0.08 to 0.14 in the presently preferred practice of the invention. The diffuser cone 24 and diverter cone 28, in the presently preferred practice, have an included apex angle on the order of 150 degrees.

The conical face 38 of the diverter, in cooperation with the diffuser cone 18, or the downstream face of the orifice plate 118 provides increased surface area for the pressure drop across the orifice and thus functions to minimize cavitation.

Figure 4:
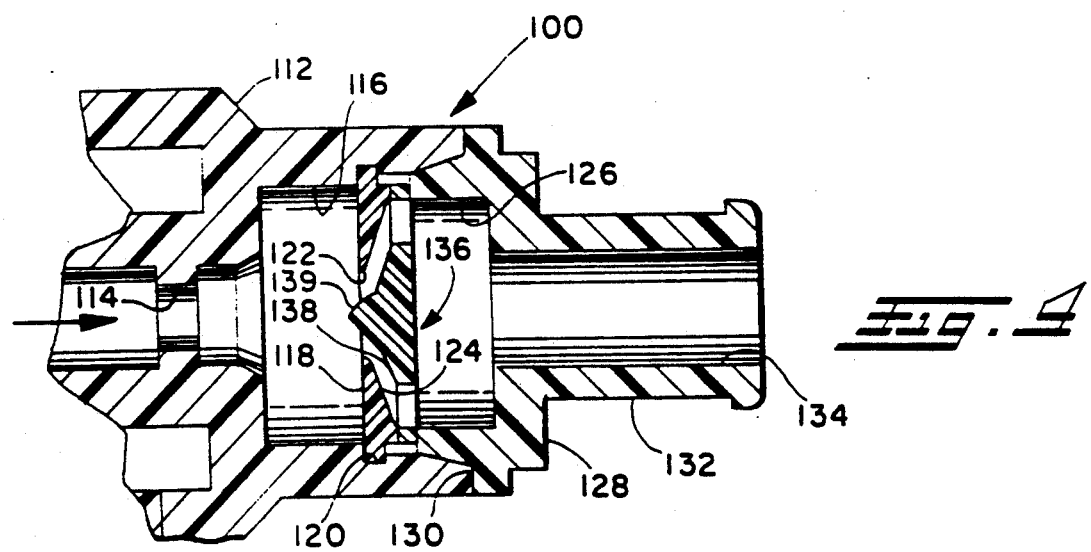
FIG. 4 is a view similar to FIG. 1, showing an alternate embodiment of the invention.

Referring to FIG. 4, another embodiment of the invention is illustrated generally at 100, having a body 112 with inlet 114 communicating with inlet chamber 116, having an orifice plate 118 provided therein, registered in a groove 120 in the body, and having a central flow limiting orifice 122 formed therein. The downstream face of the orifice plate 118 has a tapered conical diffuser surface 124 communicating with an expansion chamber 126, which is formed in a cover 128 attached to body 112 and sealed thereabout along parting line 130, preferably by non-metallic weldment. Cover 128 has boss or nipple 132 formed thereon with an outlet passage 134 therethrough communicating with expansion chamber 126. The sizing of the expansion chamber 126 and outlet 134 is similar to that described above with respect to the embodiment of FIG. 1.

The embodiment of FIG. 4 has a diverter indicated generally at 136, which has the upstream face thereof disposed adjacent the diffuser cone 124; and, the upstream face 138 of the diverter 136 has a conically tapered surface having an obtuse included apex angle.

An auxiliary or secondary conically tapered surface, indicated at 139 is formed concentrically with the surface 138 and the auxiliary conically tapered surface 139, has a generally right angled included apex angle, and extends into the orifice 122. The location and spacing of the diverter 136 from the diffuser cone 124 is similar to that described above with respect to the embodiment of FIG. 1.

Figure 5:
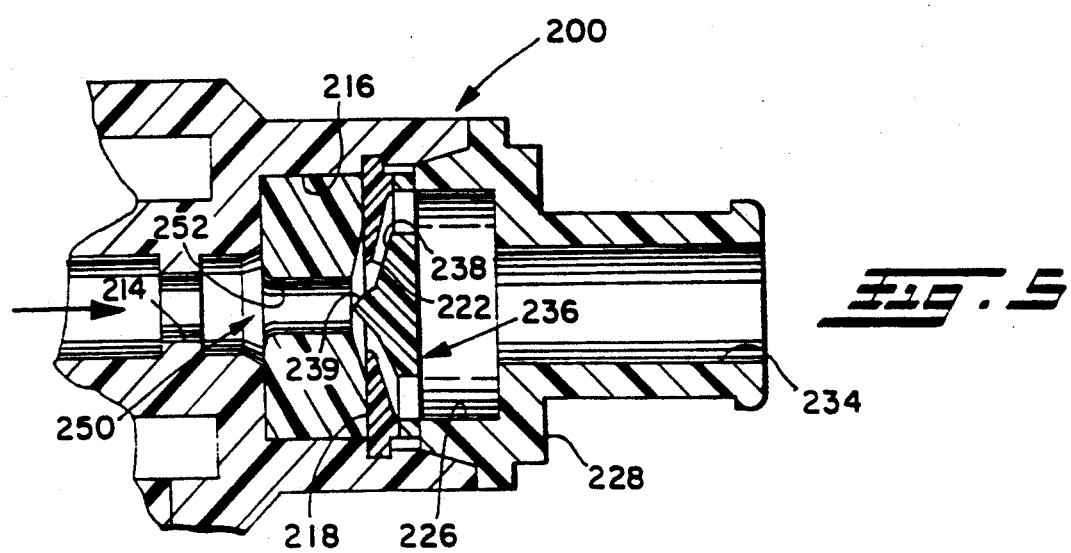
FIG. 5 is a view similar to FIG. 1, showing an embodiment of the invention employing an elastomeric flow control washer; and, FIG. 6 is a graphical slot of flow noise as a function of control orifice pressure drop comparing the prior art with the present invention.

Referring to FIG. 5, another embodiment of the invention is indicated generally at 200, and has a chamber 216 formed on the upstream face of the orifice plate 218. The chamber 216 has disposed therein a resilient elastomeric control washer indicated generally at 250, which has the thickness and diameter thereof conformed to the walls of chamber 216, and has a flow control orifice 252 formed centrally therein. It will be understood that the flow control orifice 252 is not greater than the diameter of the flow limiting orifice 222 provided in the orifice plate 218. The assembly 200 includes a diverter 236 disposed adjacent the downstream side of orifice 222 in an expansion chamber 226 communicating with an outlet 234 formed in cover 228. It will be understood that the structural configuration of the embodiment 200 of FIG. 5 is otherwise identical to that of FIG. 4.

In the present practice of the invention, at a flow rate of 1.75 gallons per minute, a noise level reduction of 6 decibels on the "A" scale from the level of the known present technology has been achieved in a flow control assembly made in accordance with the invention and employing a single orifice elastomeric flow control washer having a pressure drop of 60 psi (414 KPa) thereacross.

Referring to FIG. 6, values of noise level in decibels, measured at a distance of 2 inches (51 mm) from the source of noise, are plotted as ordinates for differing values of the pressure drop $\Delta P$ across the assembly resulting from varying inlet pressures plotted as abscissa. The upper graph in FIG. 5 represents measurements taken for a flow-through device employing only a single orifice elastomeric flow control washer without the present invention. The middle graph represents measurements taken for flow through a device having only a tri-orifice (3 hole) elastomeric flow control washer without the present invention. The lower graph represents a flow control device employing a single orifice elastomeric flow control washer with the diverter and expansion chamber of the present invention disposed immediately downstream of the flow control washer. From the graph of FIG. 5, it will be seen that the present invention provides at least 3 decibels, or fifty percent (50%) noise reduction for $\Delta P$ greater than 20 psi (130 KPa).

The present invention thus provides a unique and novel flow control assembly for an appliance water inlet which employs a conically tapered diverter immediately adjacent the downstream face of the flow control orifice. The diverter has an obtuse included apex angle in its simplest form, and an auxiliary generally right angled conically tapered surface for controlling pressure drop immediately adjacent the downstream edge of the orifice plate for diverting flow and reducing cavitation as the flow enters the expansion chamber which attenuates flow noise. The present invention thus provides a convenient and low cost way of reducing flow noise in a flow control device.

Although the invention has hereinabove been described with respect to the illustrated embodiments, it will be understood that the invention may be modified and varied by those having ordinary skill in the art, and is intended as limited only by the scope of the following claims.

I claim:

1. A fluid flow noise reducing assembly comprising:
 (a) body means defining a flow inlet and a flow limiting orifice communicating with said inlet;

(b) said body means further defining an expansion chamber having the largest dimension thereof transverse to the flow at least five multiples of the diameter of the orifice and an outlet communicating with said expansion chamber, said expansion chamber having the lengths thereof not less than one-third the aforesaid transverse dimension; and, (c) a flow diverter disposed in said chamber adjacent the discharge side of said orifice, said diverter having a generally conical surface formed thereon, said conical surface having an obtuse included angle, said diverter having the base diameter of the conical surface at least one and one-half multiples of the diameter of said flow limiting orifice, wherein a noise reduction of at least three (3) decibels for $\Delta p$ greater than 20 psi (130 KPa) measured at a distance of 2 inches (51 mm) from the source of the noise is achieved.

2. The assembly defined in claim 1, wherein said flow diverter includes a second conical surface having an acute included angle and disposed concentrically with said obtuse angle conical surface, said second conical surface having portions thereof extending into said orifice.

3. The assembly defined in claim 1, wherein said body means includes a cavity on the inlet side of said orifice with a pressure responsive flow control device disposed therein adjacent said flow limiting orifice.

4. The assembly defined in claim 1, wherein said flow control device is a washer formed of elastomeric material and is deformed under changing inlet pressure for regulating flow therethrough.

5. The assembly defined in claim 1, wherein said diverter is spaced from the downstream side of said orifice by an amount, expressed as ratio of said orifice diameter, in the range of 0.08 to 0.14.

6. The assembly defined in claim 1, wherein said diverter has a second conical surface thereon concentric with said obtuse angle conical surface, said second conical surface having apex angle comprising a generally right angle.

7. A fluid noise reducing assembly comprising:
(a) body means defining a flow inlet and a flow limiting orifice having a generally conical diffusion surface with an obtuse apex angle formed thereabout on the downstream side thereof communicating with said inlet;

(b) said body means further defining an expansion chamber and an outlet communicating with said expansion chamber; and, (c) a flow diverter disposed in said chamber adjacent the discharge side of said orifice, said diverter having a generally conical surface formed thereon, said conical surface having an obtuse included angle.

* * * * *